(12) United States Patent
Monks et al.

(10) Patent No.: US 8,740,456 B2
(45) Date of Patent: Jun. 3, 2014

(54) ADJUSTING DELIVERY OF CURRENT IN A CONNECTION BASED ON TEMPERATURE

(75) Inventors: Morgan H. Monks, Tempe, AZ (US); Kenneth W. Gay, Tucson, AZ (US); Timothy J. Knowlton, Benson, AZ (US)

(73) Assignee: SMSC Holdings S.A.R.L., Luxembourg (LU)

( * ) Notice: Subject to any disclaimer, the term of this patent is extended or adjusted under 35 U.S.C. 154(b) by 327 days.

(21) Appl. No.: 13/109,446

(22) Filed: May 17, 2011

(65) Prior Publication Data

US 2012/0294332 A1 Nov. 22, 2012

(51) Int. Cl.
G01K 1/00 (2006.01)
G01K 7/00 (2006.01)

(52) U.S. Cl.
USPC ............ 374/141; 374/163; 374/183; 702/130

(58) Field of Classification Search
USPC ............. 374/170, 1, 163, 183, 141, 152, 208, 374/137, 185, 179, 45; 702/99, 130
See application file for complete search history.

(56) References Cited

U.S. PATENT DOCUMENTS

| | | | |
|---|---|---|---|
| 4,791,290 A * | 12/1988 | Noone et al. ................ | 250/239 |
| 5,181,026 A | 1/1993 | Granville | |
| 5,185,594 A * | 2/1993 | DeChurch .................... | 340/596 |
| 6,072,681 A | 6/2000 | Cogan et al. | |
| 6,430,517 B1 * | 8/2002 | Williams ........................ | 702/63 |
| 6,780,060 B1 * | 8/2004 | Kajiura et al. ............ | 439/620.21 |
| 6,893,153 B2 * | 5/2005 | Hoffer et al. .................. | 374/152 |
| 6,905,362 B2 * | 6/2005 | Williams ...................... | 439/490 |
| 7,074,089 B2 * | 7/2006 | Kajiura et al. ........... | 439/620.01 |
| 7,108,528 B2 * | 9/2006 | Wambsganss et al. ....... | 439/188 |
| 7,255,263 B2 * | 8/2007 | Isaacson et al. ........ | 235/144 SM |
| 7,797,560 B2 | 9/2010 | Diab | |
| 7,944,666 B2 * | 5/2011 | Lin et al. ........................ | 361/103 |
| 2002/0043978 A1 * | 4/2002 | McDonald .................... | 324/508 |
| 2002/0126431 A1 * | 9/2002 | Yanagisawa .................. | 361/103 |
| 2004/0058588 A1 * | 3/2004 | Demeocq ...................... | 439/894 |
| 2006/0238169 A1 * | 10/2006 | Baker ........................... | 320/150 |
| 2007/0006603 A1 * | 1/2007 | Reusche et al. .............. | 62/196.4 |
| 2009/0124131 A1 * | 5/2009 | Breunsbach et al. ......... | 439/652 |
| 2009/0139972 A1 * | 6/2009 | Baker et al. .................... | 219/201 |
| 2011/0134575 A1 * | 6/2011 | Ward et al. ...................... | 361/42 |
| 2011/0152844 A1 * | 6/2011 | Charles .............................. | 606/1 |
| 2011/0181294 A1 * | 7/2011 | Ziegler .......................... | 324/538 |
| 2012/0249066 A1 * | 10/2012 | Ichikawa ....................... | 320/109 |
| 2013/0100982 A1 * | 4/2013 | Gase et al. ....................... | 374/45 |

* cited by examiner

Primary Examiner — Gail Verbitsky
(74) Attorney, Agent, or Firm — King & Spalding L.L.P.

(57) ABSTRACT

Adjusting current based on temperature. A change in temperature of a connection between a first device and a second device may be measured. The change in temperature may be performed while the first device provides current to the second device over the connection. If the change in temperature is above a threshold, the current being provided from the first device to the second device may be reduced. The change in temperature may be performed by the first device and/or the second device, e.g., by measuring the temperature of a connector of the connection.

13 Claims, 4 Drawing Sheets

ADJUSTING DELIVERY OF CURRENT IN A CONNECTION BASED ON TEMPERATURE

FIELD OF THE INVENTION

The present invention relates to the field of connections, and more particularly to a method for adjusting delivery of current in a connection based on temperature.

DESCRIPTION OF THE RELATED ART

In recent years, there has been a proliferation of portable devices that connect to host devices for receiving power (e.g., for charging a battery), data (e.g., synching files from the host device), etc. Typically, the portable device and host device are connected via a physical connection (e.g., a wire or cable).

Many device manufacturers have increased the amount of current and/or power delivered to these portable devices for various reasons, e.g., to provide a faster battery recharge for the portable device. However, the increase in current causes an increase in temperature in the connections and may result in catastrophic failure (e.g., in the connection, in the portable device, and/or in the host device). Current specifications may specify a maximum volt-ampere (VA), such as "25 VA per connector". Unfortunately, this limit neglects the fact that heating is caused by $I^2R$ effects. Additionally, since most connections are manufactured by many different manufacturers, there is presently no guarantee that a particular cable and connector combination can transfer power without overheating. Accordingly, improvements in connections are desired.

SUMMARY OF THE INVENTION

Various embodiments are presented of a system and method for adjusting delivery of current based on temperature.

A first device and a second device may be coupled together over a connection (e.g., a cable or wire). The first device may provide current (e.g., power) to the second device over the connection. Each device may include a port for receiving a corresponding connector of the connection. For example, a first connector of the connection may be coupled to the port of the first device while a second connector of the connection may be coupled to the port of the second device.

A change in temperature of the connection may be measured while the current is provided from the first device to the second device. The change in temperature may be measured in a variety of manners. For example, the change in temperature may be measured by determining an ambient temperature and determining a temperature of one of the connectors of the connection. The change may be the difference between the ambient temperature and the temperature of the first connector of the connection. In another embodiment, an initial temperature (e.g., before power and/or current is provided over the connection) of a connector may be determined and compared with a current temperature. In this embodiment, the change in temperature may therefore be the difference between the initial temperature and the current temperature. The change in temperature may involve the measurement of a temperature of an electrical assembly (e.g., a port) connected to one of the connectors of the connection. The temperature of the connector (or connection in general) may be determined by measuring the temperature near a power pin and/or data pin of one of the connectors of the connection. In various embodiments, the temperature may be measured by an integrated circuit (or other circuitry) of one or both of the two devices.

If the change in temperature is above a threshold, the current being provided form the first device to the second device may be adjusted. For example, the current being provided between the two devices may be reduced, e.g., in order to prevent overheating (and resulting failure) of the connection. According to various embodiments, the adjustment may be performed by either of the two devices. For example, the first device may measure the temperature change and adjust the current. Alternatively, the first device may measure the temperature change and adjust the current. In further embodiments, one of the devices may measure the change and the other of the devices may perform the adjustment (e.g., in response to a communication from the measuring device to change the temperature or providing the change in temperature).

The measurement and possible adjustment may be performed a plurality of times while current is provided over the connection. Additionally, rather than determining the change and temperature (and whether that change is above a threshold), the method may simply determine if the current threshold is above a temperature threshold. Similarly, the acceleration of the temperature (the second derivative) may be measured and compared to an acceleration threshold.

BRIEF DESCRIPTION OF THE DRAWINGS

A better understanding of the present invention can be obtained when the following detailed description of the preferred embodiment is considered in conjunction with the following drawings, in which.

Figure 1A:
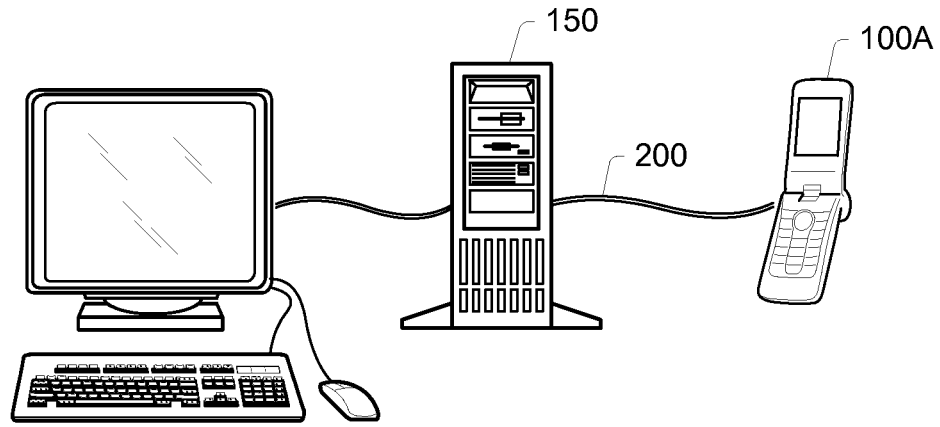
FIGS. 1A and 1B illustrate exemplary systems suitable for implementing various embodiments of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network and/or other physical transmission medium, that conveys signals such as electrical, electromagnetic, or digital signals.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Portable Device—any of various types of portable computing devices, including cell or mobile phones (including smart phones), PDAs, digital cameras, portable media players, netbooks, etc. In general, the term "portable device" can be defined to encompass devices (or combinations thereof) which include at least one processor that executes instructions from a memory medium and is easily carried (e.g., handheld) by a user.

Figure 1B:
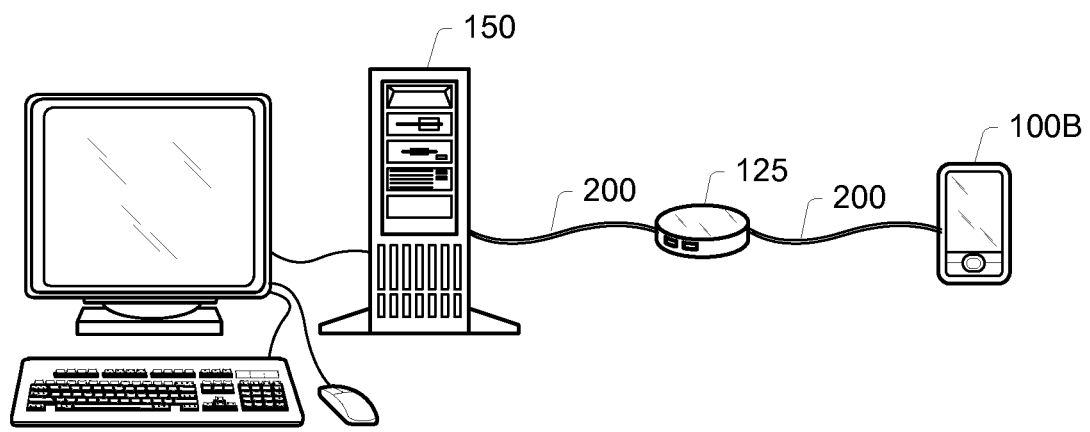

FIGS. 1A and 1B—Exemplary Systems

FIGS. 1A and 1B illustrate embodiments of an exemplary system configured to modify current (or power) delivered to between a first device 100 and a second device 150 (e.g., a host, such as a computer system), as described below. As shown in FIG. 1A, the first device 100A (e.g., a cell phone, such as a smart phone) may be coupled to the second device 150. In FIG. 1B, the first device 100B (e.g., an MP3 player) may be coupled to the second device 150 via a hub 125.

In various embodiments, the first device 100 may be connected to the second device 150 or the hub 125 via a connection 200 (which is generally referred to as a "cable" or "wire"). Similarly, the hub 125 may be coupled to the second device 150 via a connection 200. The connection 200 includes a physical medium for conveying signals (e.g., one or more wires or fiber optics) and/or power between devices, as well as a connector at each end for connecting the physical medium to the devices. For example, the connection 200 may include two male connectors which plug in to a female connector (e.g., a port or jack) at each of the devices. In some devices, the connection 200 may be fixed to one of the devices (e.g., such as the mouse or keyboard of FIGS. 1A and 1B, where the connection is a part of the device itself). However, even in devices with a fixed connection, the connection 200 may still be coupled to the device via a fixed connector. In the discussions below, the connection 200 is assumed to be removable (where the connection can be separated from both of the devices being connected), but fixed connections are also envisioned.

The devices and connections may be any of various types. For example, the first device 100 and second device 150 may be USB compatible and the connection 200 may be a USB connection. Alternatively, the connection 200 may be a fiber optic connection, a Firewire connection, a DVI connection, an HDMI connection, a VGA connection, an XLR connection, etc. Thus, while the connection 200 is shown only between the first device 100 and the second device 150 (or between the first device 100 and the hub 125 or the hub 125 and the second device 150), the connection 200 may be between any of the devices shown in FIGS. 1A and 1B, among other possible devices. As described herein, the connection 200 may generally be configured to support the provision of power from one device to another (e.g., for charging a battery of the first device 100). The connection 200 may also generally be configured to support the provision of data from one device to another (e.g., for transferring data between the first device 100 and the second device 150).

The first device 100 may be any of numerous devices (e.g., portable devices). For example, the first device 100 may be a cell phone (e.g., cell phone 100A illustrated in FIG. 1A), a personal music player (e.g., player 100B illustrated in FIG. 1B, e.g., an mp3 player, and/or an IPOD™, among other players, a CD player, etc.), a personal video player (e.g., a digital video player, a DVD player, etc.), a peripheral device (e.g., a printer), an input device (e.g., a game controller, touchpad, mouse, and/or keyboard, among others), or any other device that receives power (e.g., and data) from another device or power source. Thus, the first device 100 may be any of a variety of appropriate devices.

Additionally, the second device 150 may be any of various devices. More specifically, the second device 150 may be a computer system, a hub, e.g., an external hub or one included in an electronic system (e.g., the computer system or display device, among others), and/or other types of devices, such as ones that provide power to the first device 100. In one embodiment, the second device 150 device may be a USB on-the-go (OTG) device which may be operable to act as a host and a device, e.g., depending on the situation. Thus, according to various embodiments the second device 150 may be any of various appropriate devices.

The second device 150 of FIGS. 1A and 1B may include/ couple to a display device configured to display video signals received from the second device 150 and/or to act as a hub. In some embodiments, the display device may act as the hub 125 as well as displaying video signals from the second device 150. Thus, the hub 125 may be incorporated in the display device of the second device 150. Additionally, the second device 150 may include a keyboard and mouse, e.g., which may be USB devices. The keyboard and mouse may couple to the second device 150 in a variety of ways, e.g., directly to the second device 150 or via the USB hub included in the display device, among other methods. Thus, in FIGS. 1A and 1B, the keyboard and mouse are shown coupled to the display, which may act as a hub. Alternatively, the keyboard and mouse may be coupled to the second device 150, e.g., a hub included in the second device 150.

Additionally, the devices 100 and/or 150 may include at least one memory medium on which one or more computer programs or software components may be stored. For example, the memory medium may store operating system software, as well as other software for operation of the devices. Various embodiments further include receiving or storing instructions and/or data implemented in accordance with the foregoing description upon a carrier medium. Generally, one or both of the devices 100 and 150 may include logic (e.g., circuitry and/or processor(s) and memory medium(s)) for implementing the methods described herein.

Note that the above descriptions of the first device 100, the second device 150 (and associated components), and the hub 125 are exemplary only and other components and systems are envisioned. For example, while the various devices are shown as coupling via wires, the devices may be coupled wirelessly, e.g., via wireless USB, Bluetooth, WLAN, etc.

Figure 2A:
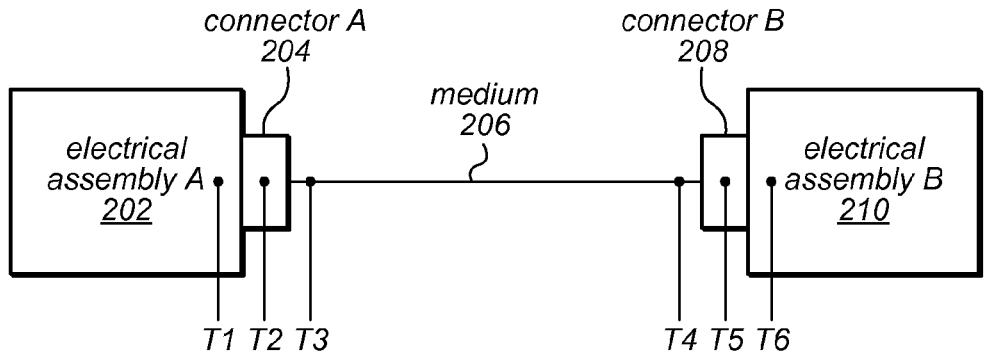
FIG. 2A is a block diagram of an exemplary connection, according to one embodiment.
Figure 2B:
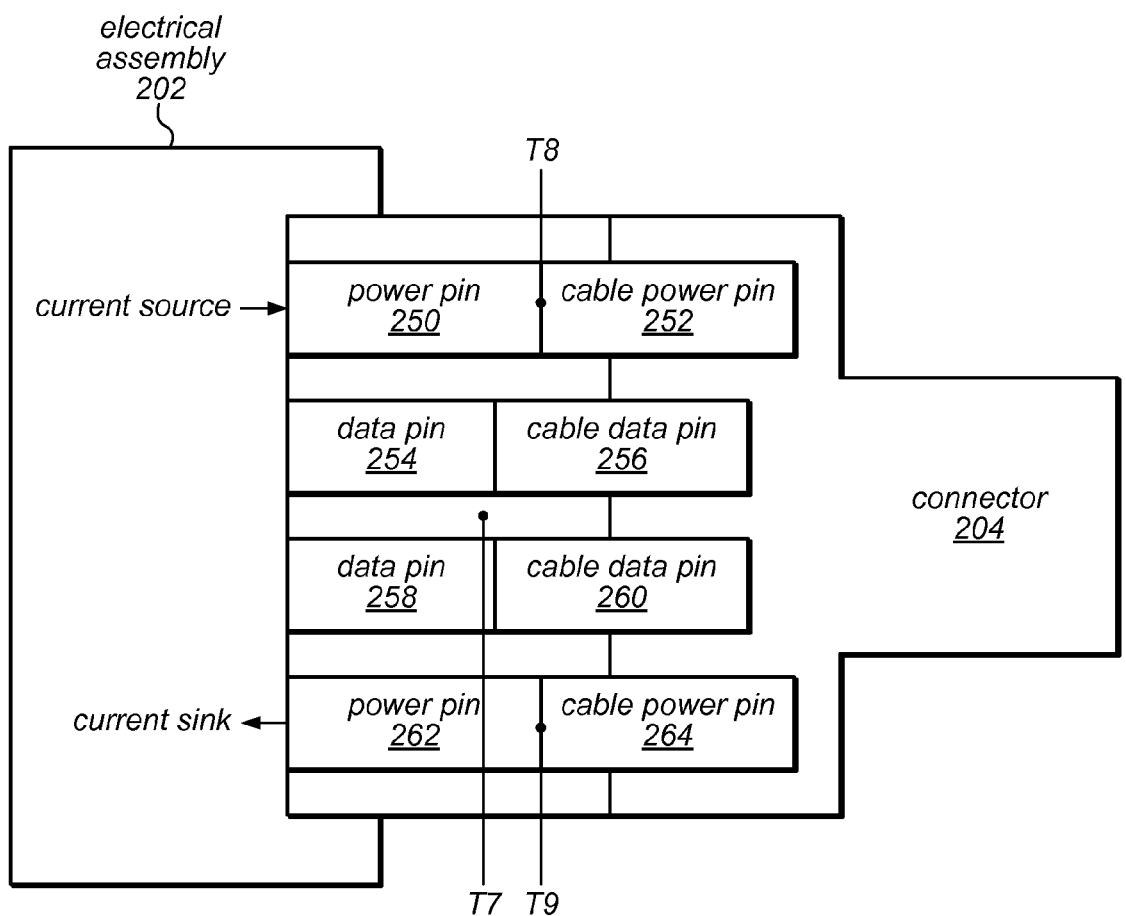
FIG. 2B is a block diagram of a connector, according to one embodiment.

FIGS. 2A and 2B—Exemplary Block Diagrams of a Connection

FIGS. 2A and 2B are block diagrams illustrating an embodiment of the connection 200 coupling the first device 100 and the second device 150.

As shown in FIG. 2A, the connection 200 may include physical medium 206 connected to connector 204 and connector 208. Each of the connectors 204 and 208 may be connected to electrical assemblies 202 and 210, respectively. In one embodiment, the electrical assemblies 202 and 210 may be ports (or connectors) of the first device 100 and the second device 150. Thus, in FIG. 2, the connection 200 may be connected to both the first device 100 and the second device 150 via the corresponding connectors of the connection and the electrical assembly of the respective device.

FIG. 2B illustrates a more detailed block diagram of a connector 204 connected to the electrical assembly 202. As shown, the connector 204 may include a cable power pin 250, cable data pin 256, cable data pin 260, and cable power pin 264. The electrical assembly 202 may similarly include power pin 250 (for connecting to cable power pin 252), data pin 254 (for connecting to cable data pin 256), data pin 258 (for connecting to cable data pin 260), and power pin 262 (for connecting to cable power pin 264). Power may be provided from the device including the electrical assembly 202 via power pin 250 to cable power pin 252 for provision of power through the connection 200, and may be received by the device including the electrical assembly 202 via power pin 262 from cable power pin 264 for reception of power through the connection 200.

Figure 4:
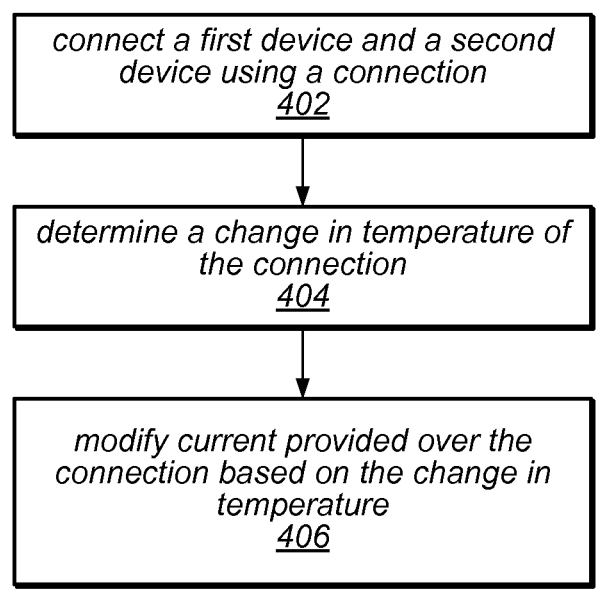
FIG. 4 is a flowchart diagram illustrating one embodiment of a method for adjusting provided current based on temperature.

The labels T1-T9 are exemplary locations for temperature measurement and are discussed in more detail with respect to the method shown in FIG. 4. Thus, FIGS. 2A and 2B provide exemplary block diagrams of the connection 200 connecting the first device 100 and the second device 150.

Figure 3:
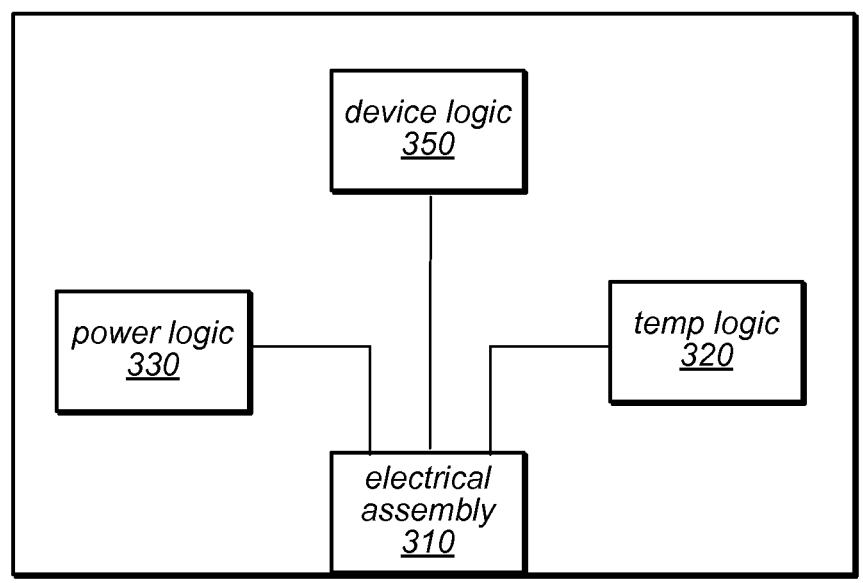
FIG. 3 is a block diagram of a device, according to one embodiment.

FIG. 3—Exemplary Device Block Diagram

FIG. 3 is a block diagram of an exemplary device (e.g., the first device 100 or the second device 150). As shown in FIG. 3, the device may include an electrical assembly 310 (such as a port) for connecting to connection 200. Additionally, the device may include device logic 350 that may be configured to perform the functionality of the device. For example, the device logic may include a system on a chip (SOC), processor and memory, programmable hardware, and/or other logic to perform whatever functions the device is configured to perform. For example, device logic 350 for a cell phone, such as device 100A may be configured to perform telephone calls on a wireless network, execute applications, provide data communication, etc. As another example, device logic 350 for a computer system (e.g., such as device 150) may comprise a processor and memory for executing an operating system and applications for the operating system.

As also shown, the device may include power logic 330. The power logic 330 may include any circuitry or processor(s) necessary to provide or receive power over the connection 200. The power logic 330 may also be configured to monitor and/or change the power levels (e.g., the current) provided over the connection 200. In further embodiments, the power logic 330 may be configured to request a change in current to another device, e.g., over the connection 200. The temperature logic 320 may include any circuitry or processor(s) to measure the temperature of the electrical assembly 310, a connector of the connection 200 connected to the electrical assembly 310, ambient temperature, e.g., outside of the device, etc.

The device may include temperature logic 320, which may be configured to compare the measured temperature (or change in temperature) with a threshold temperature (or change in temperature) and initiate a change in current provided over the connection 200 when the threshold is exceeded. For example, the temperature logic 320 may indicate the threshold has been exceeded to power logic 330, which may in turn cause a reduction in current received or provided over the connection 200.

In some embodiments, the temperature logic may include a temperature sensor used to measure the temperature at the various places shown in FIGS. 2A and 2B, among other locations. The temperature logic may include a "remote sensor" (e.g., a thermistor, thermocouple, RTD, etc.) which is capable of signal conditioning and reporting (e.g., such as an integrated circuit, or a circuit comprised within an integrated circuitry that is physically embedded in the connector).

The temperature logic 320, power logic 330, and device logic 350 may be configured in other manners than shown. For example, one or more of the logic may be included on a common integrated circuit (e.g., all of the device logic 350, power logic 330, and temperature logic 320 may be included on a common SOC). Alternatively, or additionally, the power logic 330 and/or temperature logic 320 may only include the circuitry for providing power and measuring temperature, and the device logic 350 may perform the monitoring and control functionality described herein (such as comparing the reported temperature to a threshold, modifying current provision, communicating with the other device, etc.). In further embodiments, the temperature logic 320 and/or power logic 330 may be incorporated within the electrical assembly 310, as desired.

FIG. 4—Adjusting Current Provision Based on Temperature

FIG. 4 illustrates a method for adjusting provision of current on a connection based on temperature. The method shown in FIG. 4 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, a first device and a second device (e.g., the first device 100 and the second device 150) may be connected. For example, a user may physically attach the first and second devices using a connection (such as the connection 200). The second device may provide current (e.g., power) to the first device over the connection. Each device may include a port for receiving a corresponding connector of the connection. For example, a first connector of the connection may be coupled to a port of the first device while a second connector of the connection may be coupled to a port of the second device. In one embodiment, a USB cable may be connected to a USB port of a first USB device on one side, and may be coupled to a port of a USB host on the other side. In this embodiment, the two USB devices may perform enumeration. However, other types of connections and devices are envisioned, and thus, embodiments described herein are not limited to USB devices and connections.

In 404, a change in temperature of the connection may be measured while the current is provided from the first device to the second device. The change in temperature may be measured in a variety of manners, e.g., using the temperature logic 320 described above. For example, the change in temperature may be measured by determining an ambient temperature and determining a temperature of one of the connectors of the connection. The change may be the difference between the ambient temperature and the temperature of the first connector of the connection. For example, one or more analog temperature sensors may be used to measure the temperature of the ambient environment and of the connector (or port). More specifically, the ambient temperature could be measured at points T3 for connector A and T4 for connector B in FIG. 2A. The corresponding connector temperatures may be measured using a sensor that is local to the connector or electrical assembly (e.g., the port of the device). These sensor(s) may measure the temperature of the connector or electrical assembly at locations such as T1 or T2 for connector A and T5 or T6 for connector B. Accordingly, the change in temperature may be the difference between T3 and T1 or T2 (for connector A) or between T4 and T5 or T6 for connector B. For example, in one embodiment, the change in temperature for connector A may be T1-T3 and the change in temperature for connector B may be T6-T4. Note that the method may only be performed for one of the connectors (e.g., the connector connected to the device that is receiving the power or current); however, in further embodiments, the change in temperature may be measured at both sides, and the largest of the two changes may be used for 406 below.

FIG. 2B illustrates a number of other points where temperature could be measured (T7-T9). These points could be used for T1, T2, T5, or T6 in the discussions herein. As shown, T8 and T9 are points near the power pins of connector 204. The temperature sensors that measure these points may be included in or near electrical assembly 202 (e.g., the port of the device) so that points T8 and T9 could be measured when connector 204 is inside electrical assembly 202. For example, these points may be at or near the physical contacts between the electrical assembly 202 and the connector 204. In some embodiments, the general area of the connector (e.g., T7) may be sufficient for temperature measurement rather than at the power pins T8 or T9; however, any one or more of the points T1-T9 may be used to determine the temperature of the connection or connector, depending on the given application.

In another embodiment, an initial temperature of a connector may be determined and compared with a current temperature. In one embodiment, the initial temperature may be measured before current or power is provided over the connection. However, the initial temperature and current temperature could be a moving window that is measured over time (e.g., every 1 ms, 10 ms, 50 ms, 100 ms, 500 ms, 1 s, 2 s, 5 s, 10 s, 30 s, 1 m, etc.). In these embodiments, the change in temperature may therefore be the difference between the initial temperature and the current temperature. The change in temperature may involve the measurement of a temperature of an electrical assembly (e.g., a port) connected to one of the connectors of the connection. The temperature of the connector (or connection in general) may be determined by measuring the temperature near a power pin and/or data pin of one of the connectors of the connection. In various embodiments, the temperature may be measured by an integrated circuit (or other circuitry) of one or both of the two devices. Thus, the temperature may be measured at any one or more of the points T1-T9. Where more than one is measured, the greatest difference may be used for the connection, the difference may be determined between the average of the points, etc.

While embodiments described herein are primarily related to the first or second device performing the temperature measurement (e.g., and including the temperature measurement circuitry or devices), the measurement may alternatively (or additionally) be included in or performed by the connection itself. Thus, in one embodiment, the connection may be configured to measure its temperature (or change in temperature) according to the methods described herein.

In 406, if the change in temperature is above a threshold, the current being provided from the first device to the second device may be adjusted. For example, the change in temperature threshold may be an increase in temperature of 30 degrees Celsius, although other embodiments are envisioned. In response to the change in temperature being above the threshold, the current being provided between the two devices may be reduced, e.g., in order to prevent overheating (and resulting failure) of the connection. According to various embodiments, the adjustment may be performed by either of the two devices (e.g., the power logic of the devices). For example, the first device may measure the temperature change and adjust the current. Alternatively, the first device may measure the temperature change and adjust the current. In further embodiments, one of the devices may measure the change and the other of the devices may perform the adjustment (e.g., in response to a communication from the measuring device to change the temperature or providing the change in temperature).

Alternatively, or additionally, if the change in temperature is above the threshold, the power provided over the connection may be changed (e.g., it may be reduced or the level of current and voltage may be changed) to reduce the temperature of the connection. In one embodiment, the first or second device may modify the power being provided automatically or may request that the other of the devices change the provision of power.

Additionally, rather than determining the change and temperature (and whether that change is above a threshold), the method may simply determine if the current threshold is above a temperature threshold. For example, there may be a threshold temperature at which the connector(s) of the connection, physical medium of the connection, electrical assembly of the device(s), or other components fail. Accordingly, the threshold temperature may be set at that level or a level substantially below the fail level (e.g., 5 or 10 degrees below the fail level, 1%, 2%, 5%, 10% below the fail level, etc.) Similarly, the acceleration of the temperature (the second derivative) may be measured and compared to an acceleration threshold, rather than the change in temperature described above.

The measurement (404) and possible adjustment (406) may be performed a plurality of times while current or power is provided between the two devices over the connection. Accordingly, when the threshold in temperature change is reached, the current may be reduced until a safe operating temperature is realized.

EXAMPLES

The following are examples of the methods described herein.

In a first example, a power supply is capable of providing 9-36 Vdc at up to 1 amp of current through a cable to a portable device. The portable device is capable of operation with an input voltage of 9-36V, with its input power management being a switch mode power supply (assumed 100% efficient, regardless of input voltage, in this example). The power supply and portable device are 'matched devices', e.g. the portable device can operate at any voltage the power supply is able to provide. The temperature of the power supply connector before any current flows to the portable device is 27 deg C. The power supply has a temperature delta limit on its connector of 30 Deg C. The power supply starts providing 9 Vdc to the portable device. The portable device consumes 1 A of current. However, soon after, the power supply connector temperature approaches 57 Deg C., which it detects. At this point the power supply increases its voltage output to 18V and the portable device accordingly decreases its current consumption to 0.5 A. After a period of time, the temperature stabilizes and operation continues in this manner.

In a second example, similar to above, except many connects-disconnects of the cable occurs between the two units over time. As a result of these connects and disconnects, the contact resistance at the power supply end of the cable increases significantly. Due to the increased $I^2R$ power dissipation, the power needs to yet again increase its output voltage (this time to 36V). The portable device then decreases its current consumption to 0.25 A. In this fashion a 'safe' temperature delta is maintained at the power supply connector.

In a third example, the temperature rise occurs at the portable device end. It communicates to the power supply that it is approaching its deltaT threshold, to which the power supply increases its voltage and the portable device throttles down its current in order to meet the 'safe operating temperature delta' of the portable device.

In a fourth example, if the power supply has no knowledge of what the portable device input voltage is allowed to be, then the portable device would need to somehow communicate that to the power supply. For example, this could be performed via data transfer, either wired or wireless, or even by more simpler means, e.g. specially keyed cable connectors that physically communicate this information to/from both devices.

Advantages

The methods described herein provide many advantages over prior systems. As indicated in the background section, prior solutions may simply limit the VAs that can be provided over a connection. However, these limits do not guarantee that the connections will not fail using such a limit. For example, resistance of a connector may increase over time (e.g., through use), which may result in a higher level of heating at various different currents. Similarly, since many different manufacturers make connections, the quality and characteristics of each different connection cannot be accounted for by such a simple limit.

Further, some devices, such as hard disk drives, may require higher operating current at certain times (e.g., during spin up). Due to differing designs and the myriad of connectors, cables, ambient operating temperatures, and power delivery sources available, it is difficult (if not impossible) to guarantee consumer operation will be within a safe operating temperature without actual measurement of temperature and some means to regulate it.

As another example, connections such as fiber optic cables may sometimes include a power delivery medium (e.g., a copper wire); however, overheating of the connection (e.g., via the copper wire) may cause expansion and/or movement of the fiber optics, which may result in a failed connection.

Accordingly, by measuring the temperature (or change in temperature) of a connection, such uncertainties can be avoided and power or current can be provided in a manner that is within a safe operating temperature. Thus, the methods described above provide advantages over simple operating limits, such as a VA limit.

Additionally, by actually measuring the temperature (or change in temperature), a higher amount of power or current may be provided than was typically possible. For example, since the temperature can be measured, the current or power can be increased until it is near or at the threshold temperature, thereby allowing a maximum (or near maximum) amount of power or current to be provided to the device. This increase in power provision may be especially beneficial to devices that need battery recharging, particularly those with large batteries, such as laptops or tablet computers.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for adjusting current based on temperature, comprising:
    determining a change temperature at a first device wherein said temperature is measured at a first port of the first device that is configured to receive a connection to a second device;
    determining a change temperature at a second device wherein said temperature is measured at a second port of the second device that is configured to receive the connection to the first device;
    determining the greater of the changes in temperature measured at the first device and the second device, wherein said determining is performed while the first device provides current to the second device over the connection;
    determining if the greater of the changes in temperature is above a threshold;
    if the greater of the changes in temperature is above the threshold, reducing the current being provided from the first device to the second device.

2. The method of claim 1, wherein said determining the change in temperature, said determining if the change in temperature is above the threshold, and said reducing the current is performed a plurality of times while the first device provides current to the second device over the connection.

3. The method of claim 1, wherein said determining the change in temperature comprises:
    determining an ambient temperature at the first device;
    determining a temperature of a first connector of the connection; and
    determining the difference between the ambient temperature and the temperature of the first connector of the connection.

4. The method of claim 1, wherein said determining the change in temperature comprises:
    determining an initial temperature of a first connector of the connection at a first time;
    determining a current temperature of the first connector of the connection at a second time; and
    determining the difference between the initial temperature and the current temperature.

5. The method of claim 1, wherein said determining the change in temperature comprises:
    determining a temperature of a first connector of the connection by measuring a temperature of an electrical assembly connected to the first connector of the first device or the second device.

6. The method of claim 1, wherein said determining the change in temperature comprises:
   determining a temperature near a power pin of the first connector of the connection.

7. The method of claim 1, wherein said determining the change in temperature comprises:
   determining a temperature near a data pin of the first connector of the connection.

8. The method of claim 1, wherein said reducing the current is performed by the first device.

9. A device, comprising:
   a connection coupling a first device and a second device;
   a first port of the first device, wherein the first port is configured to receive a first connector of the connection;
   first logic of the first device coupled to the first port, wherein the first logic is configured to determine a temperature of the connection at the first connector;
   second logic of the first device, wherein the second logic is configured to provide current to the second device over the connection;
   a second port of the second device, wherein the second port is configured to receive a second connector of the connection;
   third logic of the second device coupled to the second port, wherein the third logic is configured to determine a temperature of the connection at the second connector;
   wherein, in response to the greater of the change in temperature determined by the first logic and the change in temperature determined by the third logic being above a threshold, the second logic is configured to reduce the current being provided from the first device to the second device.

10. The device of claim 9, wherein said first logic is configured to:
    determine an ambient temperature at the first device; and
    determine the difference between the ambient temperature and the temperature of the first connector of the connection.

11. The device of claim 9, wherein said first logic is configured to:
    determine an initial temperature of the first connector of the connection at a first time;
    determine a current temperature of the first connector of the connection at a second time; and
    determine the difference between the initial temperature and the current temperature.

12. The device of claim 9, wherein said first logic is configured to:
    determine a temperature of the first connector of the connection by measuring a temperature of the port.

13. The device of claim 9, wherein said first logic is configured to:
    determine a temperature near a power pin of the first connector of the connection; or
    determine a temperature near a data pin of the first connector of the connection.

* * * * *